(12) United States Patent
Borrillo et al.

(10) Patent No.: US 7,660,787 B2
(45) Date of Patent: Feb. 9, 2010

(54) CUSTOMIZED, PERSONALIZED, INTEGRATED CLIENT-SIDE SEARCH INDEXING OF THE WEB

(75) Inventors: David Joseph Borrillo, Rochester, MN (US); Ryan Kirk Cradick, Rochester, MN (US); Zachary Adam Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/458,532

(22) Filed: Jul. 19, 2006

(65) Prior Publication Data
US 2008/0021872 A1   Jan. 24, 2008

(51) Int. Cl.
*G60F 17/30* (2006.01)

(52) U.S. Cl. ............... 707/3; 707/6; 707/E17.059; 707/E17.108; 707/E17.083; 709/205

(58) Field of Classification Search ............ 707/3
See application file for complete search history.

(56) References Cited

U.S. PATENT DOCUMENTS

| | | | |
|---|---|---|---|
| 6,334,124 B1 * | 12/2001 | Bouchard et al. | 707/3 |
| 6,510,439 B1 | 1/2003 | Rangarajan et al. | |
| 6,594,682 B2 | 7/2003 | Peterson et al. | |
| 6,983,379 B1 | 1/2006 | Spalink et al. | |
| 7,068,309 B2 * | 6/2006 | Toyama et al. | 348/231.5 |
| 7,272,610 B2 * | 9/2007 | Torres | 707/101 |
| 7,356,711 B1 * | 4/2008 | Calinov et al. | 713/180 |
| 2004/0190853 A1 * | 9/2004 | Dow et al. | 386/46 |
| 2005/0071766 A1 * | 3/2005 | Brill et al. | 715/738 |
| 2005/0240662 A1 | 10/2005 | Wiener | |
| 2006/0235878 A1 * | 10/2006 | Shipp et al. | 707/104.1 |
| 2007/0016604 A1 * | 1/2007 | Murthy et al. | 707/102 |
| 2007/0136243 A1 * | 6/2007 | Schorn | 707/3 |

FOREIGN PATENT DOCUMENTS

WO    WO 01/44973 A2    6/2001

OTHER PUBLICATIONS

Similarity indexing: algorithms and performance David A. White and Ramesh C. Jain, Proc. SPIE Int. Soc. Opt. Eng. 2670, (1996).*

(Continued)

*Primary Examiner*—James Trujillo
*Assistant Examiner*—Albert Phillips
(74) *Attorney, Agent, or Firm*—Stephen R. Tkacs; Stephen J. Walder, Jr.; Feb R. Cabrasawan

(57) ABSTRACT

A client-side search indexing program works transparently and in conjunction with a server based search index. The combined search indexes provide a more accurate and up-to-date image of the Web, customized to the interests of each individual user. The client-side indexer customizes indexing of particular Web pages to the preferences and usage patterns of the user. The user initially installs and configures the client-side indexer on the client. The requested indexes are automatically refreshed and integrated with the main server-side indexes during a search. When the user performs a search, the client-side indexes may be combined with the main server-side index. The combined indexes provide accurate search results for the particular user.

20 Claims, 4 Drawing Sheets

OTHER PUBLICATIONS

Park, Collaborative indexing over networked information resources by distributed agents, Distrib. Syst. Engng 1, 1994, pp. 362-374.*

Bowman, The Harvest information discovery and access system, Cmoputer Networks and ISDN Systems, 1995, pp. 119-125.*

Sato, Differential Index Update in Cooperative Search Engine, Proceedings of the 15th Int'l Workshop on Database and Expert Systems Applications, 2004, pp. 1-6.*

Czajkowski et al., "Grid Information Services for Distributed Resource Sharing", Proc. 10th IEEE International Symposium on High-Performance Distributed Computing (HPDC-10), IEEE, 2001, pp. 1-14.

Chau et al., "Personalized and Focused Web Spiders", http://www.fbe.hku.hk/~mchau/papers/WebSpiders.pdf, Feb. 2003, pp. 197-217.

Bowman et al., "The Harvest information discovery and access system", Computer Networks and ISDN Systems, vol. 28, No. 1, Dec. 1995, pp. 119-125.

Pokorny, Jaroslav, "Web Searching and Information Retrieval", Computing in Science and Engineering, vol. 6, No. 4, Jul. 2004, pp. 43-48.

* cited by examiner

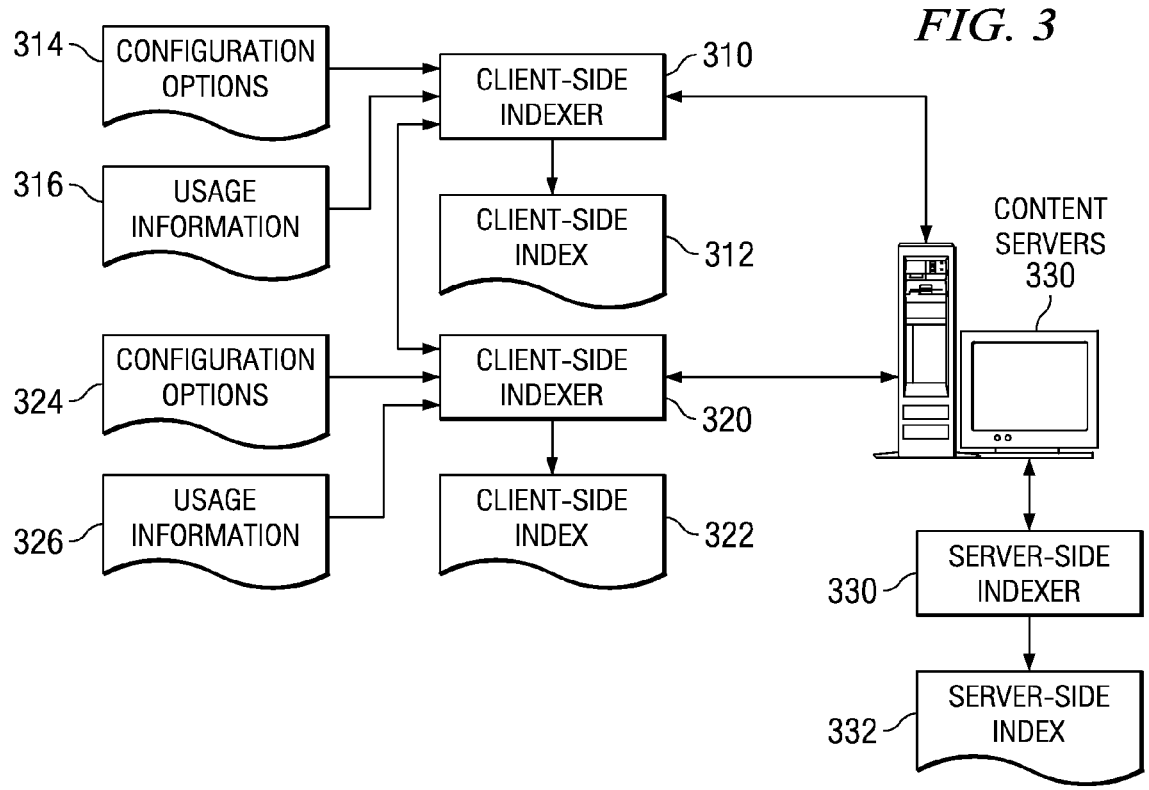
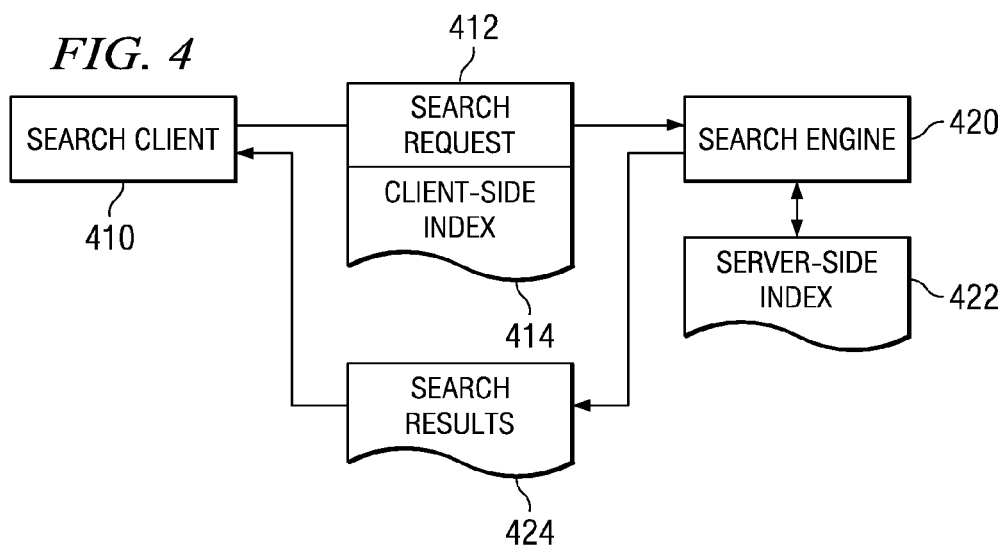

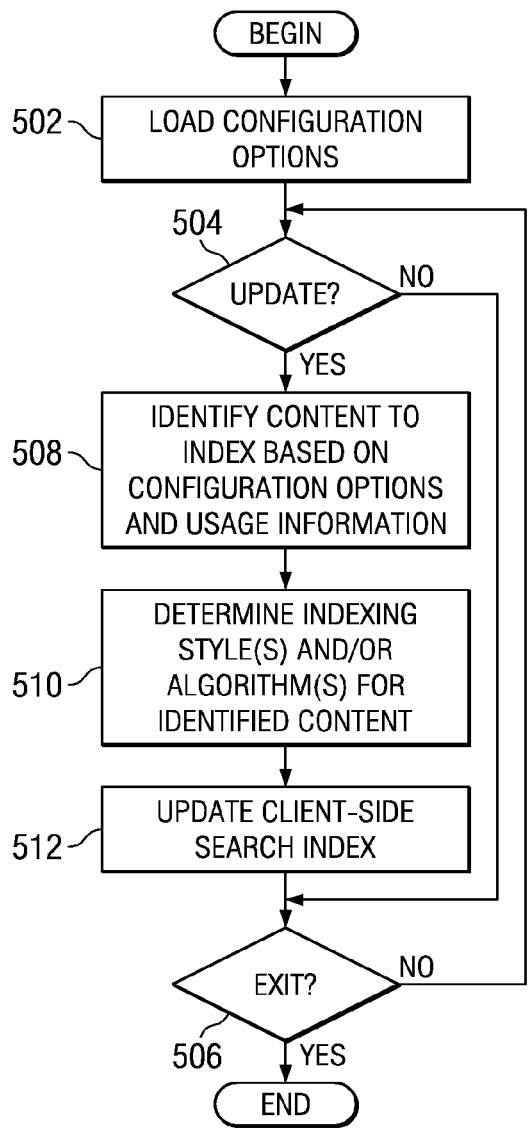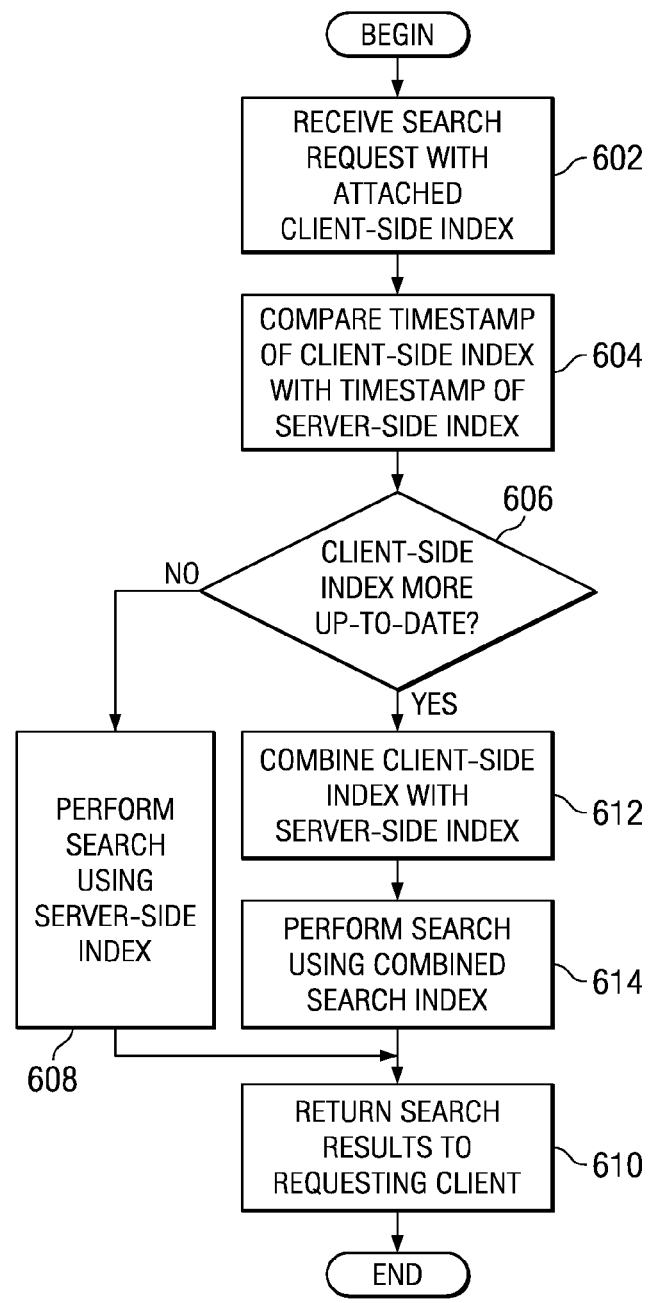

CUSTOMIZED, PERSONALIZED, INTEGRATED CLIENT-SIDE SEARCH INDEXING OF THE WEB

BACKGROUND

1. Technical Field

The present application relates generally to an improved data processing system and method. More specifically, the present application is directed to customized, personalized, and integrated client-side search indexing of the World Wide Web.

2. Description of Related Art

Internet search engines use indexes to display search results to users. The results displayed to a requesting user are only as current or up-to-date as the search indexes. Some search engines index about a third of the Web, and are only able to refresh the search index every thirty days. As the size of the Internet, and the amount of content on the World Wide Web, continues to grow, it will become increasingly difficult for search engines to discover changes, determine how frequently these changes occur, and prioritize the changes to capture.

One current solution is to update some search indexes more frequently than others. Server indexing software agents prioritize which indexes get updated more often than others. While the indexes that are updated frequently are relevant to most users, the remaining users are left with outdated indexes.

SUMMARY

In one illustrative embodiment, a computer program product comprising a computer readable storage medium having a computer readable program recorded thereon is provided. The computer readable program, when executed on a client data processing system, causes the client data processing system to load a set of configuration options at the client data processing system. The configuration options define user preferences for client-side indexing. The computer readable program may further causes the client data processing system to identify, at the client data processing system, a portion of Web content to index based on the set of configuration options and index, at the client data processing system, the portion of Web content at a client-side indexer based on the set of configuration options to form a client-side search index. The client-side search index is personalized for a user associated with the client-side indexer. The computer readable program may further causes the client data processing system to send a search query from the client data processing system to a Web search engine server data processing system with the client-side search index attached to the search query and perform a search based on a search query using a combination of the client-side search index and a server-side search index associated with the Web search engine data processing system. The web search engine data processing system combines the client-side search index with the server-side search index to form a combined search index and performs a search to satisfy the search query using the combined search index responsive to the client-side index being more up-to-date than the server-side search index. The portion of Web content is a subset of Web content indexed in the server-side search index.

In another illustrative embodiment, client data processing system is provided that comprises a processor and a memory coupled to the processor. The memory contains instructions which, when executed by the processor, cause the processor to load a set of configuration options at the client data processing system. The configuration options define user preferences for client-side indexing. The instructions may further cause the processor to identify, at the client data processing system, a portion of Web content to index based on the set of configuration options and index, at the client data processing system, the portion of Web content at a client-side indexer based on the set of configuration options to form a client-side search index. The client-side search index is personalized for a user associated with the client-side indexer. The instructions may further cause the processor to send a search query from the client data processing system to a Web search engine server data processing system with the client-side search index attached to the search query and perform a search based on a search query using a combination of the client-side search index and a server-side search index associated with the Web search engine data processing system. The web search engine data processing system combines the client-side search index with the server-side search index to form a combined search index and performs a search to satisfy the search query using the combined search index responsive to the client-side index being more up-to-date than the server-side search index. The portion of Web content is a subset of Web content indexed in the server-side search index.

In a further illustrative embodiment, a method for personalized, integrated search indexing is provided in a client data processing system. The method comprises loading a set of configuration options at the client data processing system. The configuration options define user preferences for client-side indexing. The method may further comprise identifying, at the client data processing system, a portion of Web content to index based on the set of configuration options and indexing, at the client data processing system, the portion of Web content at a client-side indexer based on the set of configuration options to form a client-side search index. The client-side search index is personalized for a user associated with the client-side indexer. The method may further comprise sending a search query from the client data processing system to a Web search engine server data processing system with the client-side search index attached to the search query and performing a search based on a search query using a combination of the client-side search index and a server-side search index associated with the Web search engine data processing system. The web search engine data processing system combines the client-side search index with the server-side search index to form a combined search index and performs a search to satisfy the search query using the combined search index responsive to the client-side index being more up-to-date than the server-side search index. The portion of Web content is a subset of Web content indexed in the server-side search index.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a diagram illustrating an integrated indexing system in accordance with an exemplary embodiment;

FIG. 4 is a diagram illustrating a search system in accordance with an exemplary embodiment;

FIG. 5 is a flowchart illustrating operation of a client-side indexer in accordance with an illustrative embodiment;

FIG. 6 is a flowchart illustrating operation of a search engine in accordance with an illustrative embodiment.

DETAILED DESCRIPTION OF THE ILLUSTRATIVE EMBODIMENTS

Figure 1:
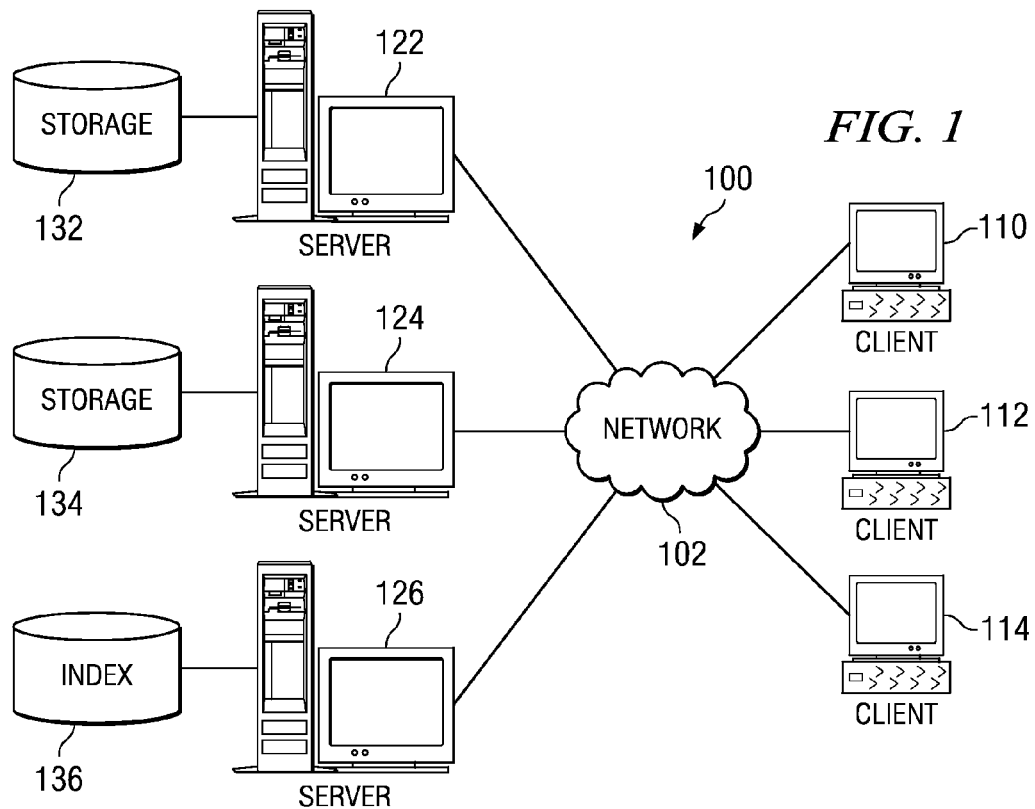
FIG. 1 depicts a pictorial representation of an exemplary distributed data processing system in which aspects of the illustrative embodiments may be implemented.
Figure 2:
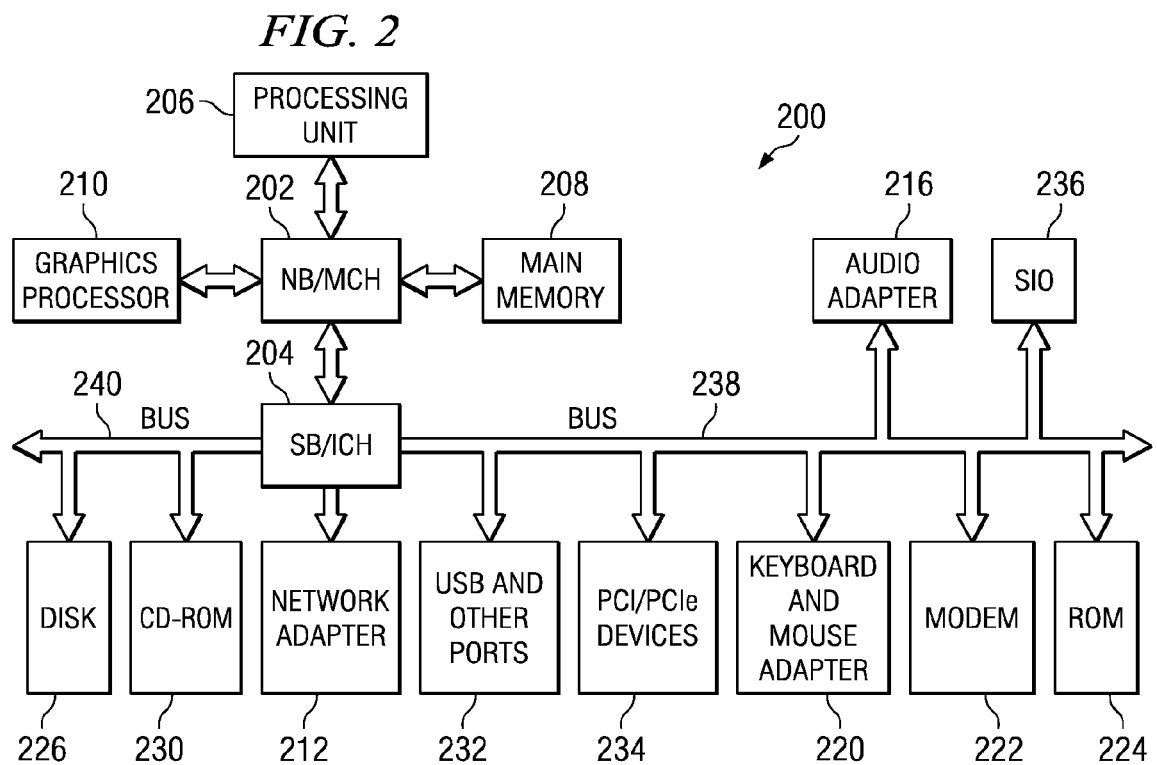
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 122 and server 124 are connected to network 102 and provide access to storage unit 132 and storage unit 134, respectively. In addition, clients 110, 112, and 114 are also connected to network 102. These clients 110, 112, and 114 may be, for example, personal computers, network computers, or the like. In the depicted example, servers 122 and 124, for example, provide data, such as Web pages, multimedia content, and applications, to the clients 110, 112, and 114. Clients 110, 112, and 114 are clients to servers 122 and 124 in the depicted example. Distributed data processing system 100 may include additional servers, clients, and other devices not shown.

Server 126 may provide a search engine for clients 110, 112, and 114. Clients 110, 112, 114 may submit a search request to a search engine on server 126, which then uses index 136 to generate a results page. To provide the most up-to-date results, server 126 accesses servers 122 and 124, or more particularly the content in storage 132 and 134, to update search index 136.

As the number of servers and the vast amount of available content continue to grow, it becomes increasingly difficult to keep search indexes up-to-date. As a result, some search indexes are updated more frequently than others. Server indexing software agents, or "bots," prioritize which indexes get updated more often than others.

In accordance with an illustrative embodiment, a client-side search indexing program works transparently and in conjunction with the server based index. The combined search indexes provide a more accurate and up-to-date image of the Web, customized to the interests of each individual user. The client-side indexer customizes indexing of particular Web pages to the preferences and usage patterns of the user.

The user initially installs and configures the client-side indexer on the client, such as one of clients 110, 112, 114. The requested indexes are automatically refreshed and integrated with the main server-side indexes during a search. When the user performs a search, the client-side indexes at client 110, for instance, may be combined with the main server-side index 136, for example. The combined indexes provide accurate search results for the particular user. The search engine at server 126 then examines the client-side indexes and the server-side indexes and compares the indexes using timestamps. The search engine uses the index with the newer timestamp. This allows the user to search using frequently updated indexes of the sites in which the user is most interested, while still utilizing the large indexes maintained by the server for the majority of the Web.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

FIG. 3 is a diagram illustrating an integrated indexing system in accordance with an exemplary embodiment. Server-side indexer 330 indexes content from content servers 330 and updates server-side index 332. As stated above, with the number of servers and the amount of content growing rapidly, it is difficult for server-side indexer 330 to keep server-side index 332 up-to-date.

In accordance with an illustrative embodiment, client-side indexers 310 and 320 provide client-side indexes 312 and 322, respectively, which are customized for particular users. Client-side indexers 310 and 320 may be, without limitation, a stand-alone application or a Web browser plug-in.

A first user installs client-side indexer 310 and sets configuration options 314. Configuration options may include the following:

Indexing schedule—when and how frequently the indexes are updated.
Inclusion list—list of sites to always index.
Exclusion list—list of sites to never index.
User data collected—what data is collected by the program for indexing.
Subscription service—list of indexes that are updated by another user's client-side indexer.
Server updates—whether to send updated indexes to Internet search engine to identify changes.
P2P index sharing—whether to share indexes with peers.
Indexing style or algorithm configuration.
Auto-indexing—when enabled, indexing application determines which pages to index.
Relevancy criteria—criteria for inclusion in the index.

These configuration options allow the user to fully customize the search indexing on the client side.

Client-side indexer 310, for example, may initiate indexing operation automatically and transparently. That is, client-side indexer 310 may index content from content servers 330 in the background according to a schedule, or perhaps when the client device is idle.

Client-side indexer 310 may determine the content to index using the inclusion list and exclusion list. Furthermore, client-side indexer 310 may determine the content to index using auto-indexing and relevancy criteria. For example, client-side indexer 310 may index recent search results, most visited sites, bookmarks or favorites, flagged sites, or sites visited by people with similar interests. For this purpose, client-side indexer 310 may store usage information 316.

Configuration options 314 may also allow the user to define the information to be indexed within pages and the indexing style or algorithm to be used. For example, a user may set configuration options 314 to index often-read Web log (blog) pages and may select a specific algorithm for indexing blogs. This algorithm may place greater emphasis on blog title, date, and trackbacks, with less emphasis being placed on older entries and comments in this example.

Similarly, client-side indexer 320 provides client-side index 322. A second user may install client-side indexer 320 and set configuration options 324. Client-side indexer may then index content on content servers 330 to form client-side index 322, according to configuration options 324. Furthermore, client-side indexer 320 may determine content to index according to relevancy criteria in configuration options 324 based on usage information 326.

Furthermore, the integrated indexing system depicted in FIG. 3 may provide a collaborative peer-to-peer (P2P) community aspect. Since each user can customize a local index to fit his or her needs, this information can also be shared with other similar users, in addition to being fed back to the server. In one embodiment, a user associated with client-side indexer 310 may be matched with a user associated with client-side indexer 320, for instance, based on similarities in their local indexes or usage information. These users may then be paired to share local indexes, index configurations, and automatic suggestions of sites to index locally. This further enhances the effectiveness and efficiency of the indexing operation without placing any additional load on server-side indexer 330.

FIG. 4 is a diagram illustrating a search system in accordance with an exemplary embodiment. Search client 410 submits search query 412 to search engine 420. Search client 410 may be a Web browser, for example, running a search application provided as a Web page from search engine 420. Search client 410 attaches client-side index 414 to search request 412. Search client 410 may also include a browser plug-in (not shown).

When search engine 420 receives search request 412 and client-side index 414, it compares a timestamp of client-side index 414 to a timestamp of server-side index 422. If the client-side index 414 is more up-to-date, then search engine 420 combines client-side index 414 with server-side index 422.

Client-side index 414 may index a portion of content that may or may not overlap with that of server-side index 422. The content indexed by client-side index 414 is specific to the preferences and usage history of a user associated with search client 410. In addition, client-side index 414 may include all or a portion of a client-side index associated with another in the P2P community.

Search engine 420 performs the search using the combined index. When the search is complete, search engine 420 returns search results 424 to search client 410.

In one exemplary embodiment, search client 410 may submit search request 412 to search engine 420. Search engine 420 may then perform the search using server-side index 422 and return search results 424. Search engine 420 may timestamp search results 424 with a timestamp of server-side index 422.

Search client 410 may also perform the search at the client side using client-side index 414. Search client 410 may also timestamp the resulting search results (not shown) with a timestamp of client-side index 414. Search client 410 may then compare the timestamp of the server search results 424 with the timestamp of the client search results. If the timestamp of the client search results indicates that client-side index 414 is more up-to-date than server-side index 424, then search client 410 may integrate the client search results into server search results 424.

FIG. 5 is a flowchart illustrating operation of a client-side indexer in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With reference now to FIG. 5, operation begins and the client-side indexer loads configuration options (block 502). The client-side indexer determines whether to update all or a portion of the client-side index (block 504). The client-side indexer may determine whether to update the client-side index based on an overall schedule, a schedule associated with a particular portion of the client-side index, whether the client device is idle, and the like.

If the client-side indexer determines not to update the client-side index, the client-side indexer determines whether an exit condition exists (block 506). An exit condition may exist, for example, if the client-side indexer closes or the client device shuts down. If an exit condition does not exist, operation returns to block 504 to determine whether to update the client-side index. If an exit condition does exist in block 506, operation ends.

Returning to block 504, if the client-side indexer determines that all or a portion of the client-side index is to be updated, the client-side indexer identifies the content to index based on configuration options and usage information (block 508). The client-side indexer determines indexing style(s) and/or algorithm(s) for the identified content (block 510). Next, the client-side indexer updates the client-side search index by indexing the identified content (block 512). Thereafter, operation proceeds to block 506 to determine whether an exit condition exists.

FIG. 6 is a flowchart illustrating operation of a search engine in accordance with an illustrative embodiment. Operation begins and the search engine receives a search request with attached client-side index (block 602). The search engine compares the timestamp of the client-side index with the timestamp of the server-side index (block 604). Then, the search engine determines whether the client-side index is more up-to-date than the server-side index (block 606).

If the server-side index is more up-to-date than the client-side index, then the search engine performs the search using the server-side index (block 608). Thereafter, the search engine returns the search results to the requesting client (block 610), and operation ends.

If at least a portion of the client-side index is more up-to-date than the corresponding portion of the server-side index in block 606, the search engine combines the client-side index with the server-side index (block 612). Then, the search engine performs the search using the combines search index (block 614). Thereafter, operation proceeds to block 610 to return the search results to the requesting client, and operation ends.

Figure 7:
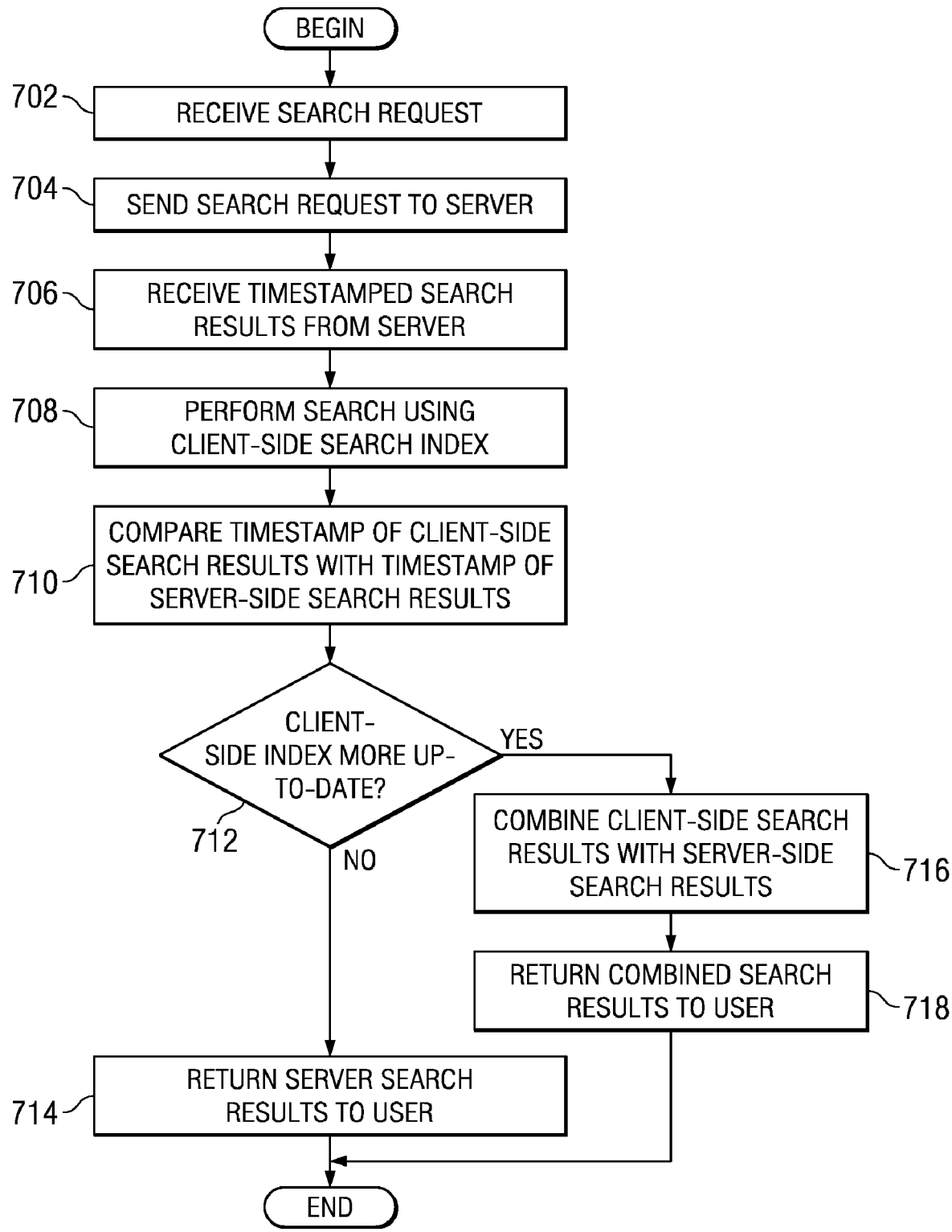
FIG. 7 is a flowchart illustrating operation of a combined client-side and server-side search in accordance with an illustrative embodiment.

FIG. 7 is a flowchart illustrating operation of a combined client-side and server-side search in accordance with an illustrative embodiment. Operation begins and the search client receives a search request (block 702). The search client sends the search request to the search engine server (block 704). The search engine server performs the search to produce a set of search results. The server timestamps the set of search results with a timestamp of the server-side search index.

Then, the search client receives the timestamped set or search results from the server (block 706). The search client also performs a search using the client-side search index (block 708). Next, the search client compares the timestamp of the client search results with the timestamp of the server search results (block 710). Then, the search client determines whether the client-side index is more up-to-date than the server-side index (block 712).

If the server-side index is more up-to-date than the client-side index, then the search client returns the server search results to the user (block 714), and operation ends. If at least a portion of the client-side index is more up-to-date than the corresponding portion of the server-side index in block 710, the search client combines the client-side search results with the server-side search results (block 716). Then, the search client returns the combined search results to the user (block 718), and operation ends.

Thus, the illustrative embodiments solve the disadvantages of the prior art by a client-side search indexing program that works transparently and in conjunction with a server based search index. The combined search indexes provide a more accurate and up-to-date image of the Web, customized to the interests of each individual user. The client-side indexer customizes indexing of particular Web pages to the preferences and usage patterns of the user.

The user initially installs and configures the client-side indexer on the client. The requested indexes are automatically refreshed and integrated with the main server-side indexes during a search. When the user performs a search, the client-side indexes may be combined with the main server-side index. The combined indexes provide accurate search results for the particular user. This allows the user to search using frequently updated indexes of the sites in which the user is most interested, while still utilizing the large indexes maintained by the server for the majority of the Web.

As the bitter rivalry among search engine providers demonstrates, any enhancement within a search engine technology can be invaluable. The illustrative embodiments provide mechanisms for improving search functionality, accuracy, and user-friendliness through customizable, integrated local search indexes personalized for each user.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a client data processing system, for personalized, integrated search indexing, the method comprising:

loading a set of configuration options at the client data processing system, wherein the configuration options define user preferences for client-side indexing;

identifying, at the client data processing system, a portion of Web content to index based on the set of configuration options;

indexing, at the client data processing system, the portion of Web content at a client-side indexer based on the set of configuration options to form a client-side search index, wherein the client-side search index is personalized for a user associated with the client-side indexer;

sending a search query from the client data processing system to a Web search engine server data processing system with the client-side search index attached to the search query; and performing a search based on the search query using a combination of the client-side search index and a server-side search index associated with the Web search engine data processing system, wherein the Web search engine data processing system combines the client-side search index with the server-side search index to form a combined search index and performs a search to satisfy the search query using the combined search index responsive to the client-side search index being more up-to-date than the server-side search index, wherein the portion of Web content is a subset of Web content indexed in the server-side search index.

2. The method of claim 1, wherein identifying a portion of Web content to index comprises identifying a set of previous search results, identifying a set of most visited Web sites, identifying a set of bookmarks or favorites, identifying flagged sites, or identifying a set of sites visited by users with similar interests.

3. The method of claim 1, wherein indexing the portion of Web content comprises:
- receiving a client-side index from a peer data processing system; and
- combining the client-side index from the peer data processing system with the client-side search index.

4. The method of claim 1, wherein the set of configuration options includes an indexing schedule and wherein the client-side indexer automatically indexes the portion of Web content according to the indexing schedule.

5. The method of claim 1, wherein the set of configuration options includes an indexing algorithm and wherein the client-side indexer indexes the portion of Web content using the indexing algorithm.

6. The method of claim 1, wherein the set of configuration options includes an inclusion list and wherein the portion of Web content always includes content from the inclusion list.

7. The method of claim 1, wherein the set of configuration options includes an exclusion list and wherein the portion of Web content never includes content from the exclusion list.

8. The method of claim 1, wherein the set of configuration options includes a first indexing algorithm and wherein the client-side indexer indexes a first portion of Web content using the first indexing algorithm, and wherein the set of configuration options includes a second indexing algorithm and wherein the client-side indexer indexes a second portion of Web content using the second indexing algorithm.

9. The method of claim 1, wherein the client-side search index has a first timestamp and the server-side search index has a second timestamp, the method further comprising:
- comparing the first timestamp of the client-side search index with the second timestamp of the server-side search index to determine whether the client-side search index is more up-to-date than the server-side search index.

10. The method of claim 1, wherein the client-side indexer automatically indexes the portion of Web content when the client data processing system is idle.

11. A computer program product comprising a computer readable storage medium having a computer readable program recorded thereon, wherein the computer readable program, when executed on a client data processing system, causes the client data processing system to:
- load a set of configuration options at the client data processing system, wherein the configuration options define user preferences for client-side indexing;
- identify, at the client data processing system, a portion of Web content to index based on the set of configuration options;
- index, at the client data processing system, the portion of Web content at a client-side indexer based on the set of configuration options to form a client-side search index, wherein the client-side search index is personalized for a user associated with the client-side indexer;
- send a search query from the client data processing system to a Web search engine server data processing system with the client-side search index attached to the search query; and
- perform a search based on the search query using a combination of the client-side search index and a server-side search index associated with the Web search engine data processing system, wherein the Web search engine data processing system combines the client-side search index with the server-side search index to form a combined search index and performs a search to satisfy the search query using the combined search index responsive to the client-side search index being more up-to-date than the server-side search index, wherein the portion of Web content is a subset of Web content indexed in the server-side search index.

12. The computer program product of claim 11, wherein identifying a portion of Web content to index comprises identifying a set of previous search results, identifying a set of most visited Web sites, identifying a set of bookmarks or favorites, identifying flagged sites, or identifying a set of sites visited by users with similar interests.

13. The computer program product of claim 11, wherein indexing the portion of Web content comprises:
- receiving a client-side index from a peer data processing system; and
- combining the client-side index from the peer data processing system with the client-side search index.

14. The computer program product of claim 11, wherein the set of configuration options includes a first indexing algorithm and wherein the client-side indexer indexes a first portion of Web content using the first indexing algorithm, and wherein the set of configuration options includes a second indexing algorithm and wherein the client-side indexer indexes a second portion of Web content using the second indexing algorithm.

15. The computer program product of claim 11, wherein the client-side search index has a first timestamp and the server-side search index has a second timestamp, wherein the computer readable program further causes the client data processing system to:
- compare the first timestamp of the client-side search index with the second timestamp of the server-side search index to determine whether the client-side search index is more up-to-date than the server-side search index.

16. A client data processing system, comprising:
- a processor; and
- a memory coupled to the processor, wherein the memory comprises instructions which, when executed by the processor, cause the processor to:
- load a set of configuration options at the client data processing system, wherein the configuration options define user preferences for client-side indexing;
- identify, at the client data processing system, a portion of Web content to index based on the set of configuration options;
- index, at the client data processing system, the portion of Web content at a client-side indexer based on the set of configuration options to form a client-side search index, wherein the client-side search index is personalized for a user associated with the client-side indexer;
- send a search query from the client data processing system to a Web search engine server data processing system with the client-side search index attached to the search query; and
- perform a search based on the search query using a combination of the client-side search index and a server-side search index associated with the Web search engine data processing system, wherein the Web search engine data processing system combines the client-side search index with the server-side search index to form a combined search index and performs a search to satisfy the search query using the combined search index responsive to the client-side search index being more up-to-date than the server-side search index, wherein the portion of Web content is a subset of Web content indexed in the server-side search index.

17. The client data processing system of claim 16, wherein identifying a portion of Web content to index comprises identifying a set of previous search results, identifying a set of most visited Web sites, identifying a set of bookmarks or favorites, identifying flagged sites, or identifying a set of sites visited by users with similar interests.

18. The client data processing system of claim 16, wherein indexing the portion of Web content comprises:

receiving a client-side index from a peer data processing system; and combining the client-side index from the peer data processing system with the client-side search index.

19. The client data processing system of claim 16, wherein the set of configuration options includes a first indexing algorithm and wherein the client-side indexer indexes a first portion of Web content using the first indexing algorithm, and wherein the set of configuration options includes a second indexing algorithm and wherein the client-side indexer indexes a second portion of Web content using the second indexing algorithm.

20. The client data processing system of claim 16, wherein the client-side search index has a first timestamp and the server-side search index has a second timestamp, wherein the instructions further cause the processor to:

compare the first timestamp of the client-side search index with the second timestamp of the server-side search index to determine whether the client-side search index is more up-to-date than the server-side search index.

* * * * *